United States Patent [19]

Kaplan et al.

[11] Patent Number: 5,074,415
[45] Date of Patent: Dec. 24, 1991

[54] METHOD AND APPARATUS FOR MANUFACTURING HEAT SHRINKABLE ENCLOSURES

[75] Inventors: Harold Kaplan, Brooksville; Joseph Castro, Freeport, both of N.Y.

[73] Assignee: Halpak Plastics, Inc., Oceanside, N.Y.

[21] Appl. No.: 664,498

[22] Filed: Mar. 5, 1991

Related U.S. Application Data

[63] Continuation of Ser. No. 522,465, May 11, 1990, abandoned, which is a continuation of Ser. No. 362,856, Jun. 7, 1989, abandoned, which is a continuation-in-part of Ser. No. 298,317, Jan. 13, 1989, abandoned, which is a continuation of Ser. No. 848,318, Apr. 4, 1986, abandoned.

[51] Int. Cl.$^5$ ............................................. B65D 65/00
[52] U.S. Cl. .................................. 206/497; 206/45.33; 383/100
[58] Field of Search ............... 206/497, 471, 484, 807, 206/45.33; 383/100, 103

[56] References Cited

U.S. PATENT DOCUMENTS

| | | | |
|---|---|---|---|
| 3,026,656 | 3/1962 | Rumsey, Jr. | 383/103 |
| 3,259,235 | 7/1966 | Sowle | 206/497 |
| 3,260,358 | 7/1966 | Gottily et al. | 206/497 |
| 3,355,303 | 11/1967 | Meyers | 206/497 |
| 3,650,775 | 3/1972 | Simon | 206/497 |
| 3,885,667 | 5/1975 | Spiegel et al. | 206/497 |
| 3,885,671 | 5/1975 | Spiegel et al. | 206/497 |
| 3,889,870 | 6/1975 | Bender | 206/497 |
| 3,948,392 | 4/1976 | Faust | 206/497 |
| 3,983,258 | 9/1976 | Weaver | 206/497 |
| 4,005,777 | 2/1977 | Marantz | 206/497 |
| 4,226,327 | 10/1980 | Ballard | 206/497 |
| 4,449,243 | 5/1984 | Platel | 383/103 |
| 4,546,881 | 10/1985 | Tasma | 206/497 |
| 4,555,025 | 11/1985 | Weinberg et al. | 206/497 |
| 4,700,528 | 10/1987 | Bernard | 206/497 |
| 4,752,288 | 6/1988 | Hussey | 206/497 |

FOREIGN PATENT DOCUMENTS

| | | | |
|---|---|---|---|
| 1082142 | 7/1980 | Canada | 206/497 |
| 2535712 | 2/1977 | Fed. Rep. of Germany | 206/497 |
| 2508001 | 12/1982 | France | 206/497 |

*Primary Examiner*—David T. Fidel
*Attorney, Agent, or Firm*—Schweitzer Cornman & Gross

[57] ABSTRACT

Disclosed herein is a new and improved method of continuously forming a heat shrinkable packaging medium from PVC tubing comprising the steps of supporting a roll of flat folded heat shrinkable seamless tubing material for controlled unwinding; directing a web of tubing drawn from said roll toward a sealing station; directing said unseamed tube to an ultrasonic welding station; applying ultrasonic welding energy exteriorly and transversely of said tube for less than the full width thereof while pinching the walls thereof between an ultrasonic horn means bearing against lower exterior surfaces of said tubing and a sealing bar means bearing against the upper surfaces of said tubing to weld said walls into a permanent joint and to form an air relief port; advancing the welded tube from said welding station to a severing station; severing said tubing downstream of said joint to separate an individual bag having an open end and closed end.

The result heating shrinkable tubular element comprises a shrinkable PVC bag having juxtaposed top and bottom walls, the sides of which are the parallel fold lines of tubing; the ultrasonically established weld permanently joining said top and bottom walls along a first edge; and an open end at a second edge opposite said first edge; the air relief port permitting trapped air to escape from the element when it is heat shrunk over an irregularly shaped object.

3 Claims, 2 Drawing Sheets

METHOD AND APPARATUS FOR MANUFACTURING HEAT SHRINKABLE ENCLOSURES

This is a continuing application of U.S. Ser. No. 07/522,465, filed on May 11, 1990, now abandoned, which is a continuing application of U.S. Ser. No. 362,856, filed on June 7, 1989, now abandoned, which in turn was a continuation-in-part application of Ser. No. 298,317, filed Jan. 13, 1989, now abandoned, which was a continuation of application Ser. No. 848,318, filed Apr. 4, 1986, now abandoned.

BACKGROUND AND SUMMARY OF THE INVENTION

The packaging and labeling arts have long used heat shrinkable plastic tubing, typically polyvinylchloride (PVC) or polyethylene, for the purposes of quickly and efficiently banding together multiples, groups or combinations of products and/or in labeling products of any shape or securing promotional premiums or the like to articles. The heat shrinkable bands or labels employed heretofore have been manufactured primarily as seamless tubing, by pneumatically expanding a continuously formed hollow cylinder of PVC or polyethylene and then permitting the expanded cylinder to be cooled. The resulting tubing has a "memory" and will shrink radially and longitudinally upon the subsequent application of heat thereto. Alternatively, heat shrinkable tubing has been formed by taking flat sheets or webs of heat shrinkable PVC or other heat shrinkable material and folding the same into a flat folded "tube" or band by connecting the free ends by a sealed seam or joint.

Disclosed herein is a new and improved method of continuously forming a heat shrinkable packaging medium from PVC tubing comprising the steps of supporting a roll of flat folded heat shrinkable seamless tubing material for controlled unwinding; directing a web of tubing drawn from said roll toward a sealing station; directing said unseamed tube to an ultrasonic welding station; applying ultrasonic welding energy exteriorly and transversely of said tube for less than the full width thereof while pinching the walls thereof between an ultrasonic horn means bearing against lower exterior surfaces of said tubing and a sealing bar means bearing against the upper surfaces of said tubing to weld said walls into a permanent joint and to form an air relief port; advancing the welded tube from said welding station to a severing station; severing said tubing downstream of said joint to separate an individual bag having an open end and closed end.

The resulting heat shrinkable tubular element comprises a shrinkable PVC bag having juxtaposed top and bottom walls, the sides of which are the parallel fold lines of tubing; the ultrasonically established weld permanently joining said top and bottom walls along a first edge; and an open end at a second edge opposite said first edge; the air relief port permitting trapped air to escape from the element when it is heat shrunk over an irregularly shaped object.

For a better appreciation of the principles of the present invention and a more complete understanding of its attendant advantages, reference should be made to the following detailed description of the invention taken in conjunction with the accompanying drawings.

DETAILED DESCRIPTION OF THE PRESENT INVENTION

The apparatus of the present invention includes a series of stations, i.e., an unwind station; a welding station; and a severing station at which the various steps of the new process of manufacturing new and improved ultrasonically welded bags from flat heat shrinkable PVC sheet material are performed.

Figure 1:
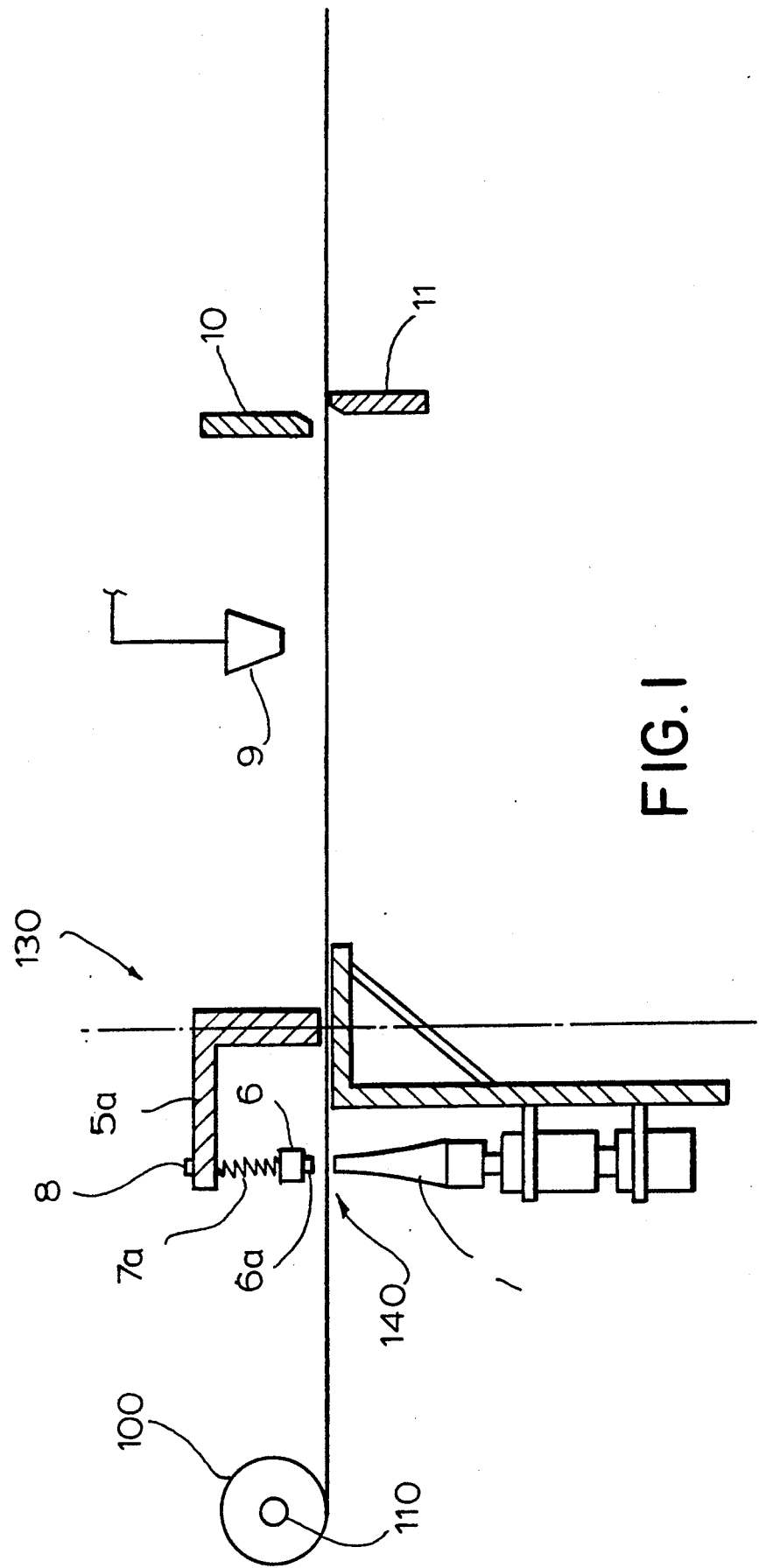
FIG. 1. is a schematic illustration of the method and apparatus employed in the practice of the present invention.
Figure 3:
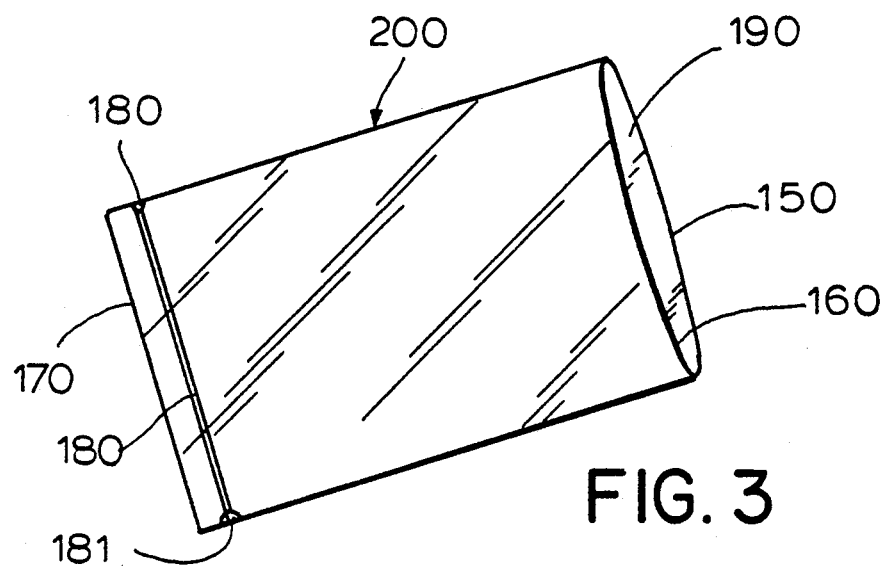
FIG. 3. is a perspective view of the new packaging medium of the invention.
Figure 2:
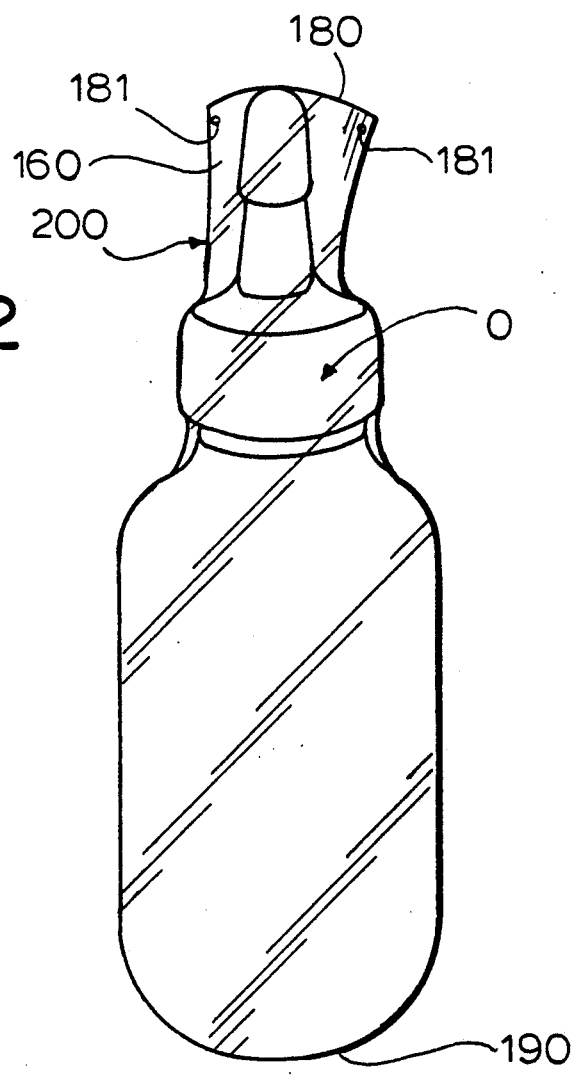
FIG. 2. is an elevational view of a new and improved package formed by the practice of the present invention.

In general, the process employs flat folded seamless PVC material in the form of a roll of tubing 100 supported on a shaft 110 about with the roll 100 may be rotated for the purposes of continuously unwinding flat PVC material in flat web form 120. The flat web 12 is advanced to a sealing station 130. As the web 12 traverses the sealing station 13, it is momentarily halted. The sealing station 130 includes a special sealing bar 6 which extends transversely of the path of travel of the web (indicated by the arrow in FIG. 1) and is supported from a cantilevered arm 5(a) through spaced vertical members 7(a) having springs acting between the arm 5(a) and the bar 6. Spring tension may be adjusted by screw means and nut 8. The tube 120 is stopped between an ultrasonic welding horn 1 and the bar 6, forming a welding nip 140, where the top layer of the tube and the bottom layer of the tube are pinched between the welded horn 1 and the anvil 6(a) of the bar when the bar is displaced against the horn 1. The top and bottom walls of the tube 120 are permanently welded one to the other along a line less than the full width of the tube in the nip 140 by the application of ultrasonic energy during pinching to form at at least one air relief port 181 (although more than one port may be formed as shown in FIGS. 2 and 3). Advantageously, the welding horn 1 applies welding energy in the range of 20 to 40 Kilohertz (KHz). Said energy may be generated and provided by readily available commercial ultrasonic welders such as manufactured by Branson Sonic Power Company, Danbury, Conn.

After welding, the tube 120 is advanced to a severing station 140, where opposed blades 10 and 11 are above and below the web 120 in its path of travel. The blades are activated in synchronism with the cessation of web advance to sever the web immediately adjacent the transverse weld. Thus, the operation is "timed" in a manner whereby at the same instant the sealing bar is activated to form a transverse weld of less than full tube width on one portion of the web, the blades 10, 11 are activated downstream to sever the tubing below the weld. The severing step forms the open end of bag while separating a completed bag from the web, as will be understood. The timing may be effected by an "electric eye" 4 focused on predetermined codes printed on the web 120.

The resultant bag 200 shown in FIG. 3 includes a front wall 150, rear wall 160, severed bottom edge 170, transverse weld 180, air relief ports 181, and open mouth 190.

The new and improved welded PVC heat shrinkable packaging produced by the practice of the present invention is shown in FIG. 2 shrunken about an irregularly shaped object. The welded edge 180 of the bag 200 is at the top while the open mouth 190 is underneath the bottom of the object. The air relief ports 181 permit the large volume of air trapped between the top of the packaged object and the top portions of the bag 200 to escape during shrinking to ensure a smooth unwrinkled package. Trapped air from the bottom of the package escapes through the mouth 190.

While a preferred method and apparatus of manufacturing the new ultrasonically welded shrinkable bag has been disclosed herein, it will be apparent to those skilled in the art that certain further modifications may be made without departing from the broad principles of the present invention, which shall be limited only to the scope of the appended claims.

We claim:

1. A safety sealed, tamper evidencing package comprising:
   (a) an irregularly shaped rigid object to be protected from tampering, and to be packaged and sealed;
   (b) a sealing, protecting, and tamper-evidencing medium comprising a two-walled envelope of predetermined width formed from continuous polyvinylchloride tubing material flat folded to have a full front wall and a full rear wall and two side edges;
   (c) said envelope having a transverse seal bonding said front and rear wall to substantially close off and to define a first end, said seal extending between the two side edges a width less than the width of the front wall and rear wall;
   (d) said envelope having an open second end;
   (e) said closed first end including at least one exposed and uncovered air relief port defined between said transverse seal and at least one of said side edges; and
   (f) at least a portion of said irregularly shaped object being disposed within said envelope and subjected to elevated temperatures in a manner whereby all trapped air is expelled externally of said envelope through said port and said open end of said envelope assumes intimate shrunken contact with not less than the majority of the irregular contours of said irregularly shaped object to seal completely and to protect said object from contamination and tampering and to provide a means for evidencing tampering or attempted tampering.

2. The package of claim 1, in which:
   (a) said transverse seal being formed by an ultrasonic weld joining said front and rear walls.

3. The package of claim 2, in which:
   (a) said weld is of less than said predetermined width to provide a discontinuity forming said relief port.

* * * * *